United States Patent [19]
Forsén

[11] Patent Number: 6,009,765
[45] Date of Patent: Jan. 4, 2000

[54] METHOD AND DEVICE FOR SELECTIVELY COLLECTING MATERIAL AND ORGANISMS ON PLANTS

[75] Inventor: Lars Forsén, Glanshammar, Sweden

[73] Assignee: Alternativ Förädling Wiik-Forsén AB, Glanshammer, Sweden

[21] Appl. No.: 09/056,247

[22] Filed: Apr. 7, 1998

Related U.S. Application Data

[63] Continuation of application No. PCT/SE96/01267, Oct. 7, 1996.

[51] Int. Cl.[7] ........................................... G01N 1/00
[52] U.S. Cl. ............................................... 73/864.33
[58] Field of Search ..................... 73/863.11, 863.12, 73/863.21, 864, 864.33, 864.34, 864.41, 864.71

[56] References Cited

U.S. PATENT DOCUMENTS 3,979,891  9/1976  Patton .
4,909,090  3/1990  McGown et al. ................... 73/864.33

FOREIGN PATENT DOCUMENTS 3742593  6/1989  Germany ............................ 73/864.41

*Primary Examiner*—Robert Raevis
*Attorney, Agent, or Firm*—Levisohn, Lerner, Berger & Langsam

[57] ABSTRACT

A method and a device for selectively collecting a first kind of matter, material, or organism from plants and on plant life by exposing the plant life to an air current flowing between a blower outlet and a suction hood. Stimulus signals are directed toward the plant life such that the signals influence a second kind of matter, material organism to leave the plants and/or the second kind of matter, matter or organism is retarded from gathering on the plant life. In this way, the second kind of matter, material or organism is not exposed to the collecting air current.

13 Claims, 1 Drawing Sheet

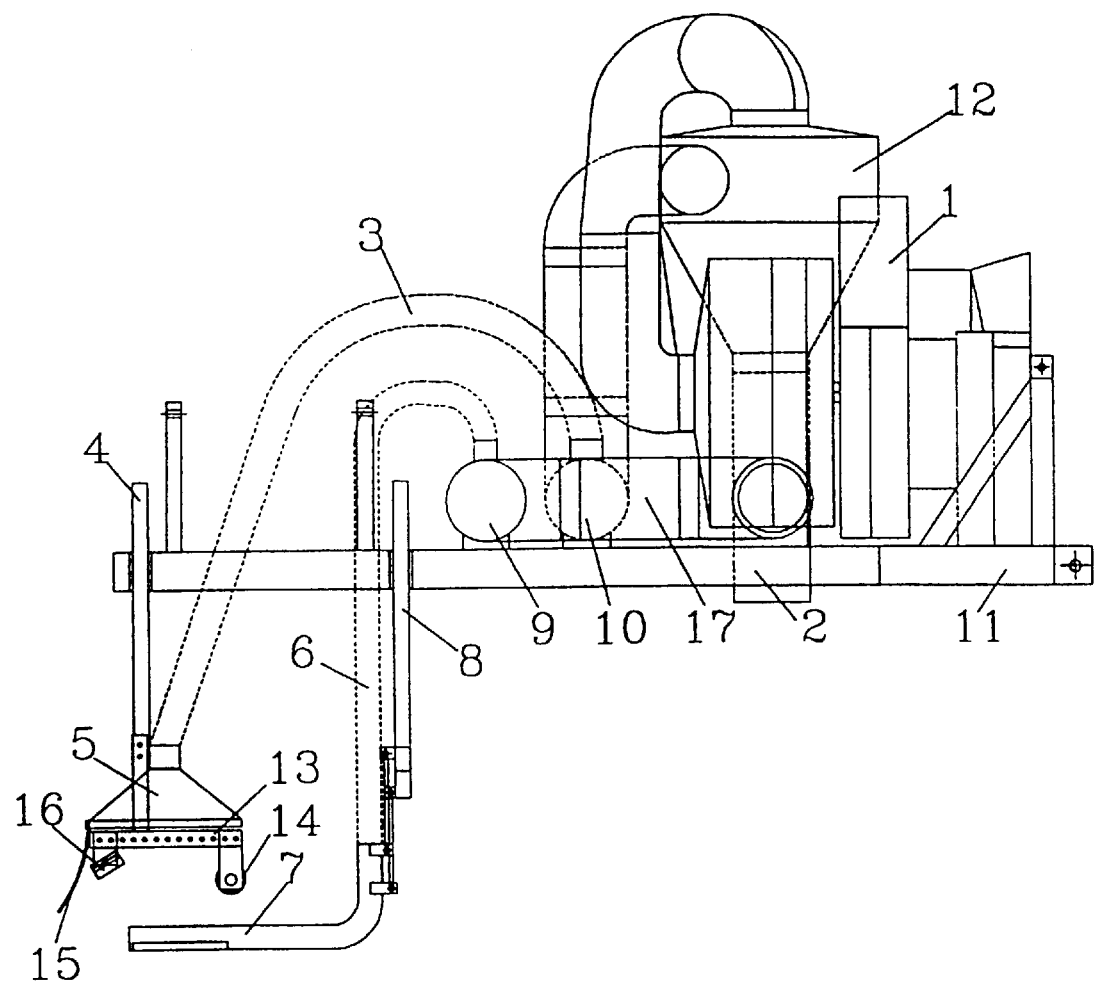

METHOD AND DEVICE FOR SELECTIVELY COLLECTING MATERIAL AND ORGANISMS ON PLANTS

This Application is a continuation of PCT/SE96/01267, filed Oct. 7, 1996, which has foreign priority under foreign Application 9503489-8 (Sweden) filed Sep. 10, 1995.

The present invention in a first aspect relates to a method according to the preamble of claim 1 and in a second aspect to a device according to the preamble of claim 6.

In connection with plant cultivation there exists a lot of different organisms which in one way or another are dependent on the plants. The purpose of this invention is to collect material and organisms, collectively matter from the plant cultivation, especially insects, arthropods and funguses in order to influence the cultivation result in the desired direction and also to make use of the collected material. This procedure creates opportunities for non-poisonous cultivation and use of the plants and the organisms free from chemicals.

The collection of organisms on plants by exposing them to compressed air and at the same time sucking them up in a container is previously known, for example by DK 24911.

There is a disadvantage with the known device, in that the material and organisms, existing on or around the plants will be injudiciously sucked-up and collected in the container. Useful insects like, for example ladybirds, bees and bumble-bees will be sucked up. Firstly it is desirable that these are left untouched. Secondly the collection of such organisms, means that the collected material is more heterogeneous which makes it more difficult to make use of it for different purposes.

The purpose of the present invention is to bring about a procedure and a device of this kind where this disadvantage is set aside and consequently some of the organisms on and around the plants are prevented to be sucked-up in the container.

According to the invention this has been attained in that a method of the kind specified in the preamble of claim 1, includes the special measures specified in this claim's characteristic portion and in that a device of the kind specified in the preamble of claim 6 has the special features specified in this claim's characteristic portion.

Owing to the fact that these signals make some of the organisms leave the plants or prevent them from congregating there, it is possible to avoid that these organisms be sucked-up in the container.

According to a preferred embodiment form of the invention these signals consist of sound-, light- or scent signals or combinations of these. Through this type of influence some kinds organisms will be frightened away, especially sound- and light signals produce this effect. Furthermore, by sending out a scent substance some kinds of organisms can be made to change residence or to avoid settling down on the plants. This allows that the following collection can be made on plants where such kinds of organisms which one does not want to collect are absent due to the scent treatment.

It is previously known, for example by SU 1 685 347, SU 1 777 754, SE 116 241 and US 1 478 424 that in collecting organisms from plants, one can expose them to different kinds of influence as for example warmth, scent, sound or light. In the known devices and procedures however this influence aims to attract the organisms in order to collect them or in combination with air-sucking improve the effect of the collection. They are therefore designed for this purpose and do not allow any separating effect.

In the dependent claims, advantageous embodiments of the invented method and the invented device are mentioned.

The invention is more deeply explained by the following detailed description of an embodiment of this with reference to the enclosed figure showing a collection device according to the invention.

BRIEF DESCRIPTION OF THE DRAWINGS

FIG. 1 is a side plan view showing the preferred embodiment of the present invention.

DETAILED DESCRIPTION OF THE DRAWING AND THE PREFERRED EMBODIMENT OF THE INVENTION

The device consists of a blower with varying suction and pressure qualities. The compressed air passes the airchannel 9 for distributing the air to the flexible pipes 6 and the especially designed blower outlets 7. The airchannel 9 is equipped with an air pressure regulator. The blower outlets are designed in order to aim an air current at the plant and the organism. The organisms are instantly sucked up, at the same time as the plants start to move, which makes it more difficult for the material and the organisms to cling to the plant and make the transportation possible through the air current to the suction hood 5. The material and organisms are transported through the flex pipes 3 to a suction channel 10, which is equipped with a device for regulation of the suction pressure which leads to a cyclone 12 with container 2. The suction hood 5 can in certain cases be equipped with an elastic screening, so the air current more easily can be led in the flow direction. In or outside the field between the blowpipe 7 and suction hood 5 the extra fittings are fixed, like equipment for heating/cooling 17 and supply adding agent, scraper 5, brushes 14, sound- and light equipment 16 on special holds 13, where they individually can be adjusted to the right height and breadth position. The equipment can be fixed on a chassis 11, which can be placed on a vehicle such as a tractor or on a selfgoing unit. The blower outlets 7 and the hood 5 are separately fixed to lifting devices 8 and 4 and through flexible tubes 6 and 3 connected with a blower unit 1 whose driving force could be power from a vehicle or a separate motor. The brush 14 is best placed horizontally and rotating and arranged as vertically and horizontally adjustable.

The field of air current between the blow- and suction outlets is best if it could be varied. This could be done by regulating the blow- or suction pressure or both of them. Another possibility of regulation could be made by arranging the outlets sideways and vertically adjustable so that their mutual distance can be adjusted. By the adjustment an adaption to the cultivated plants and to the behaviour of the organisms is brought about. Warmth or cold air can be added in order to improve the effect and can be distributed directly in the field or through blower outlet. The effect field can be multiplied with advantage through arrangement of several blow- and suction outlets in order to cover a bigger harvest area. The facilities used in order to improve the effect could then be arranged individually for each field or cover more of them. The same is true about the signal instruments which influence some of the organisms to depart in order to avoid collection.

The collected material from the field, could through the flexible pipes be collected in a container under the cyclone but before the energy source, so that there is a minimal destructive effect on the collected material which makes it possible to use this material. This procedure is to be used on plants within the following families among others: Umbellate Family (Umbelliferae), Grass Family (Gramineae), Composite/Daisy Family (Composite), Wallflower/Crucifer Family (Cruciferae), Mint/Labiate Family (Labiatae), Lily Family (Liliaceae), Flax Family (Linaceae), Heath Family (Ericaceae), Goosefoot Family (Chenopodiaceae), Rose Family (Rosaceae), Poppy Family (Papaveraceae), and the Pea Family (Leguminosae).

I claim:

1. A method for selectively collecting a first kind of matter from around and on plants by exposing the plants to an air current between a blower outlet and a suction hood, characterized by directing stimulus signals toward the plants, said signals being such that a second kind of matter is influenced to leave the plants and/or is retarded from gathering on the plants, so that said second kind of matter is not exposed to said air current.

2. A method according to claim 1, where said signals comprise one or more signals selected from the group comprising sound, light, heat and scent signals.

3. A method according to claim 1 where at least one of the following is adjustable: the blower outlets pressure; the suction hood's suction pressure; and the distance between the blower outlet and the suction hood.

4. A method according to claim 1 wherein said stimulus signals is either heat or cold.

5. A method according to claim 1 wherein the plants are further exposed to mechanical movement during said exposing step.

6. A method according to claim 5 wherein said mechanical movement is brushing.

7. A device for selective collection of matter from around and on plants comprising a blower outlet and a suction hood cooperatively arranged for exposing the plants to an air current therebetween to collect a first kind of matter characterized by signal generating means directed toward the plants and arranged to send out stimulus signals of the kind so that a second kind of matter is influenced to depart form the plants and/or is retarded from gathering on the plants, so that said second kind of matter will not be exposed to said air current.

8. A device according to claim 7, wherein said signal generating means comprises one or more signals selected from the group comprising: sound; light, heat and scent.

9. A device according to claim 7, wherein regulation means are arranged to adjust at least one of the following: the blower outlet's air pressure, the suction hood's suction pressure; and the distance between said blower outlet and said suction hood.

10. A device according to claim 7, wherein said signal generating means produces either cold or heat.

11. A device according to claim 7, further including mechanical means to impart motion to the plants.

12. A device as claimed in claim 11, wherein said mechanical means is a brush.

13. A device as claimed in claim 11, wherein said mechanical means is a scraper.

* * * * *